United States Patent [19]

Predina et al.

[11] 4,339,823
[45] Jul. 13, 1982

[54] PHASE CORRECTED CLOCK SIGNAL RECOVERY CIRCUIT

[75] Inventors: Joseph P. Predina, Fort Wayne, Ind.; Steven C. Jasper, Schaumburg, Ill.

[73] Assignee: Motorola, Inc., Schaumburg, Ill.

[21] Appl. No.: 178,401

[22] Filed: Aug. 15, 1980

[51] Int. Cl.³ .................. H03D 3/24; H04L 25/34
[52] U.S. Cl. ..................... 375/20; 329/122; 375/120
[58] Field of Search ............... 375/17, 20, 110, 120; 328/63, 133, 134; 329/50, 122, 124; 371/56; 331/1 R, 1 A

[56] References Cited

U.S. PATENT DOCUMENTS

| 3,196,352 | 7/1965 | Hopner et al. | 375/43 |
|---|---|---|---|
| 3,440,548 | 4/1969 | Saltzberg | 328/151 |
| 3,602,828 | 8/1971 | Kurzweil | 329/104 |
| 3,825,832 | 7/1974 | Frei et al. | 375/28 |
| 3,891,927 | 6/1975 | Filaferro et al. | 329/50 |
| 3,916,084 | 10/1975 | Toole | 328/63 |
| 3,986,126 | 10/1976 | Gindi et al. | 328/63 |
| 3,999,135 | 12/1976 | Gourdon et al. | 375/20 |
| 4,010,421 | 3/1977 | Lind | 375/20 |
| 4,017,803 | 4/1977 | Baker | 329/104 |
| 4,054,950 | 10/1977 | Boone | 364/900 |
| 4,272,845 | 6/1981 | Fiumani | 375/20 |

Primary Examiner—Benedict V. Safourek
Attorney, Agent, or Firm—Mark P. Kahler; Edward M. Roney; James W. Gillman

[57] ABSTRACT

Apparatus is provided for generating a recovered clock signal having pulses with a selected transitory edge timed to occur at the center of the eye intervals of a multilevel digital signal.

2 Claims, 19 Drawing Figures

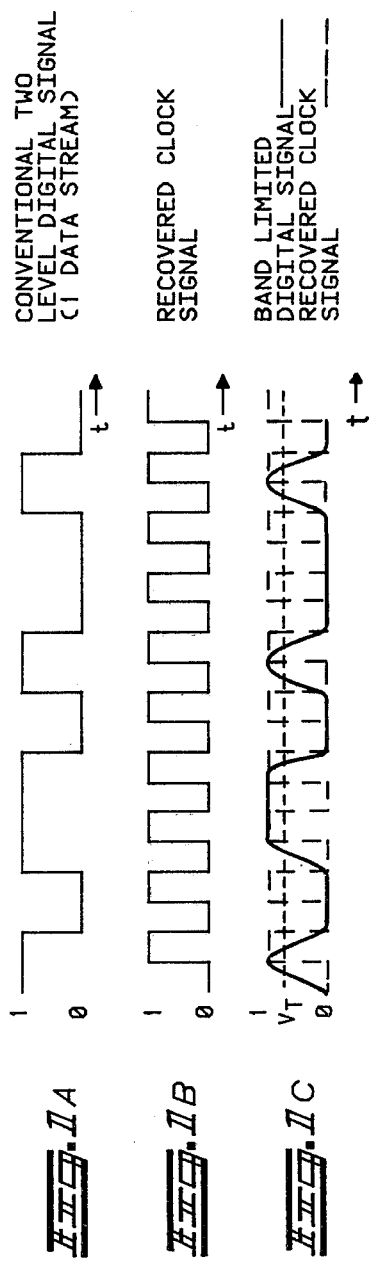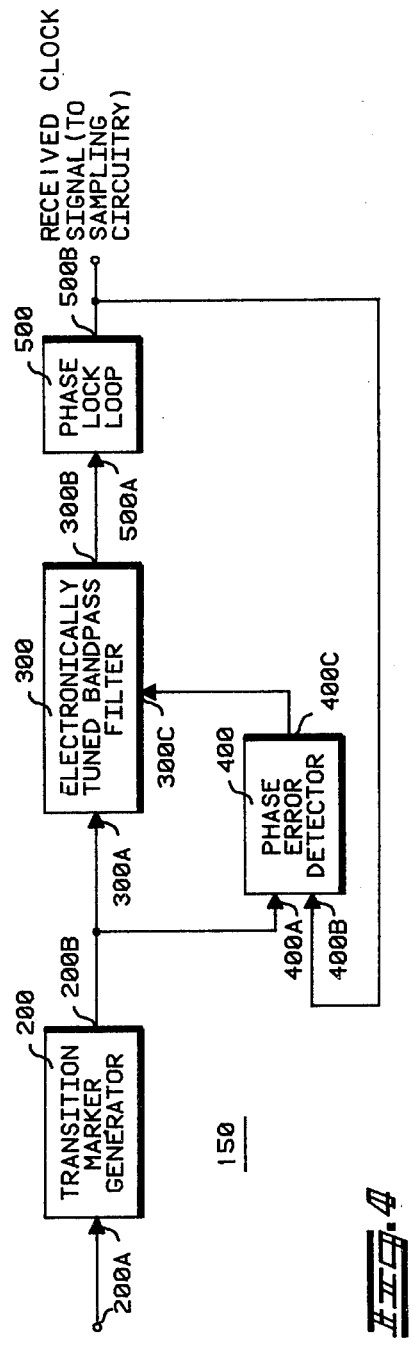

TABLE 1

| 4 LEVEL DIGITAL SIGNAL | | |
|---|---|---|
| 1 ST DATA STREAM | 2 ND DATA STREAM | LEVEL |
| 0 | 0 | 1 1/2 |
| 0 | 1 | 1/2 |
| 1 | 0 | -1/2 |
| 1 | 1 | -1 1/2 |

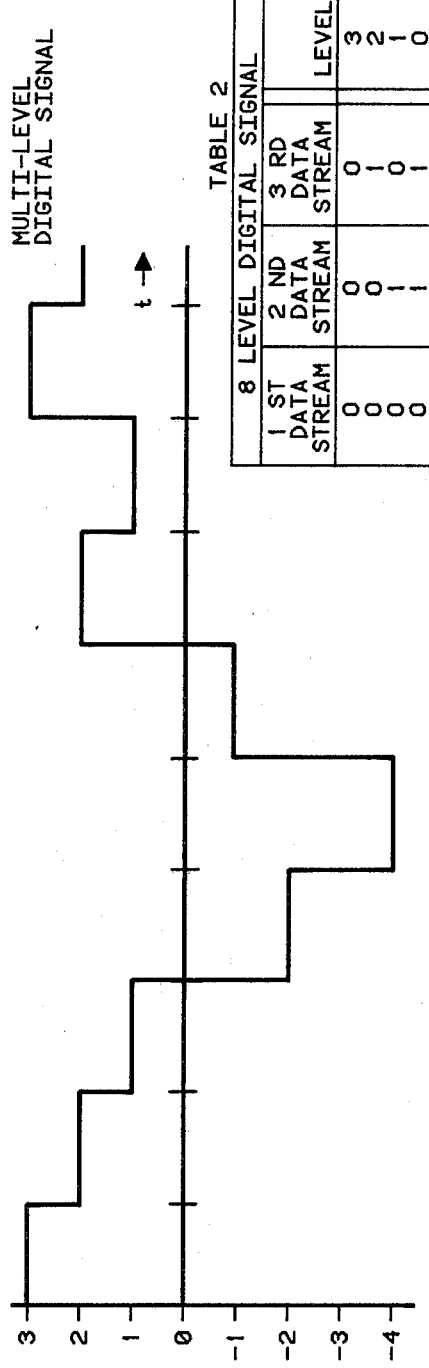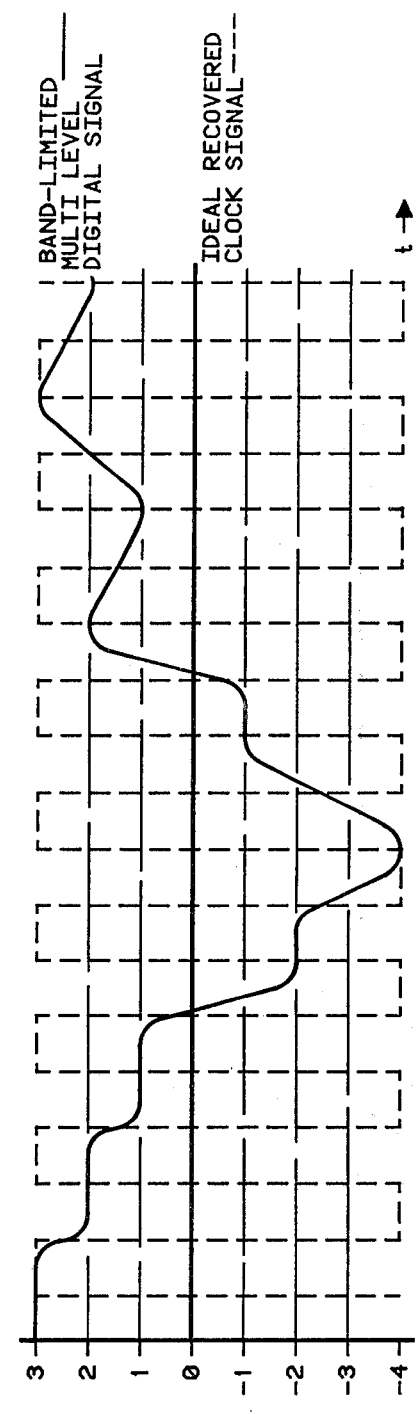
FIG. 7A
FIG. 7B

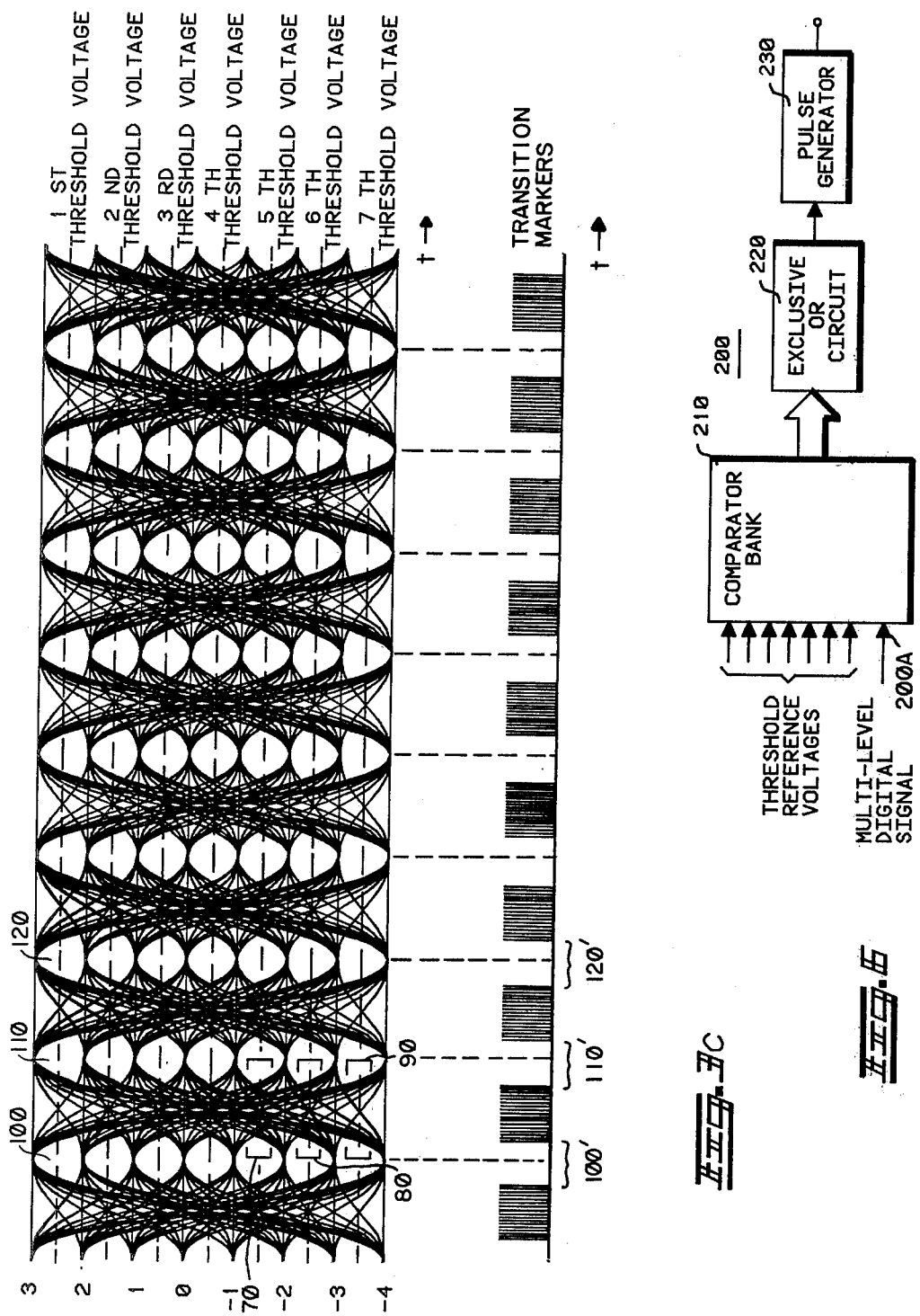

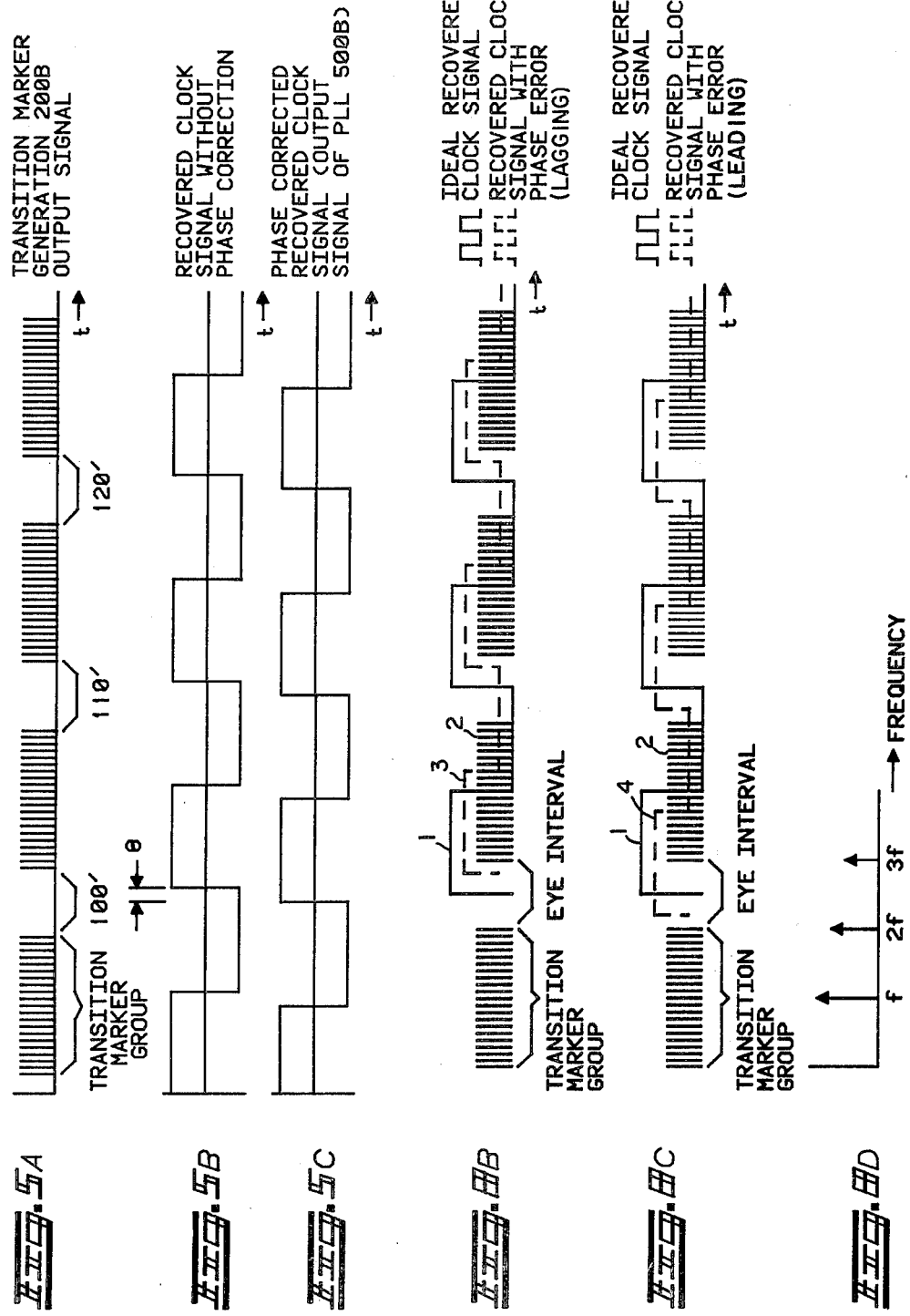

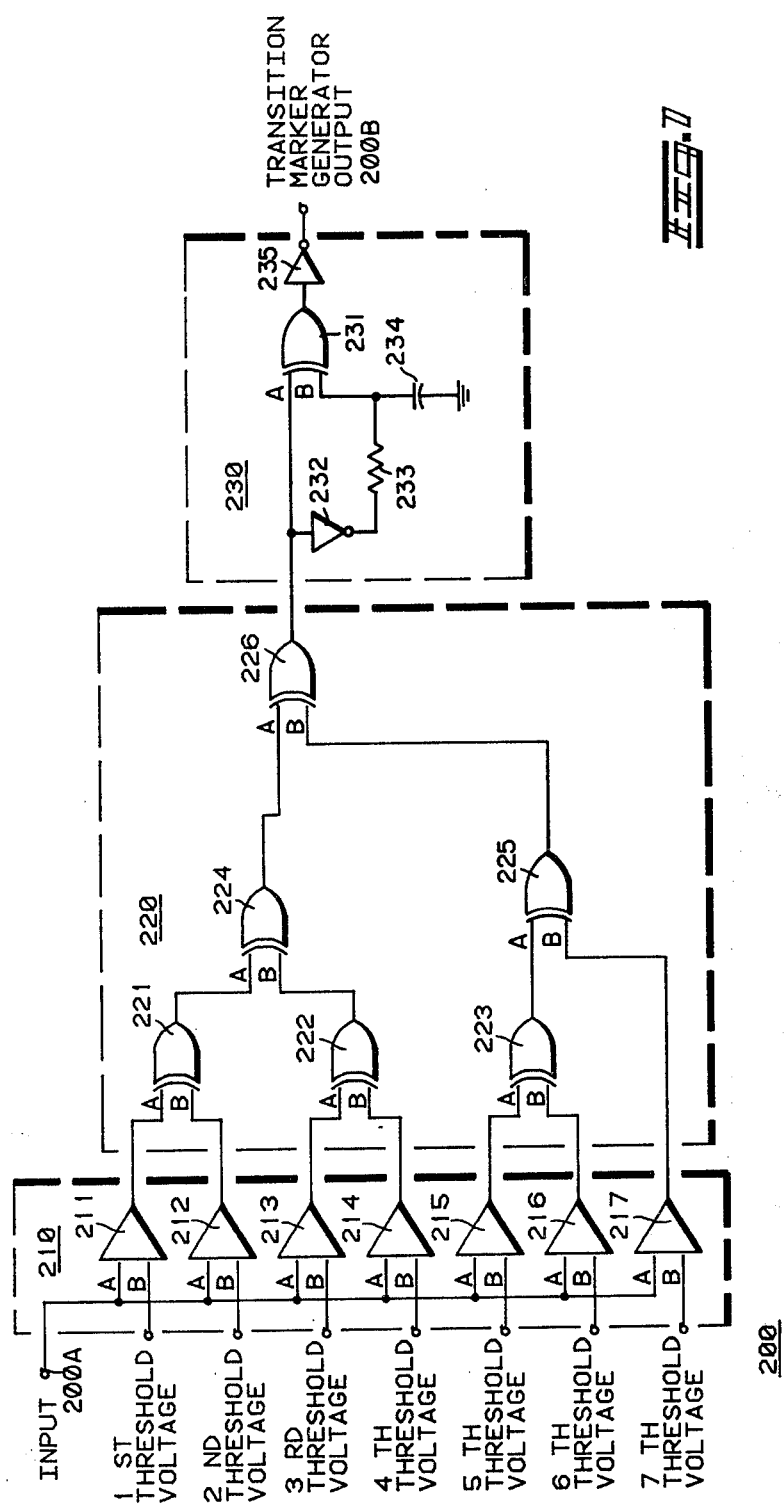

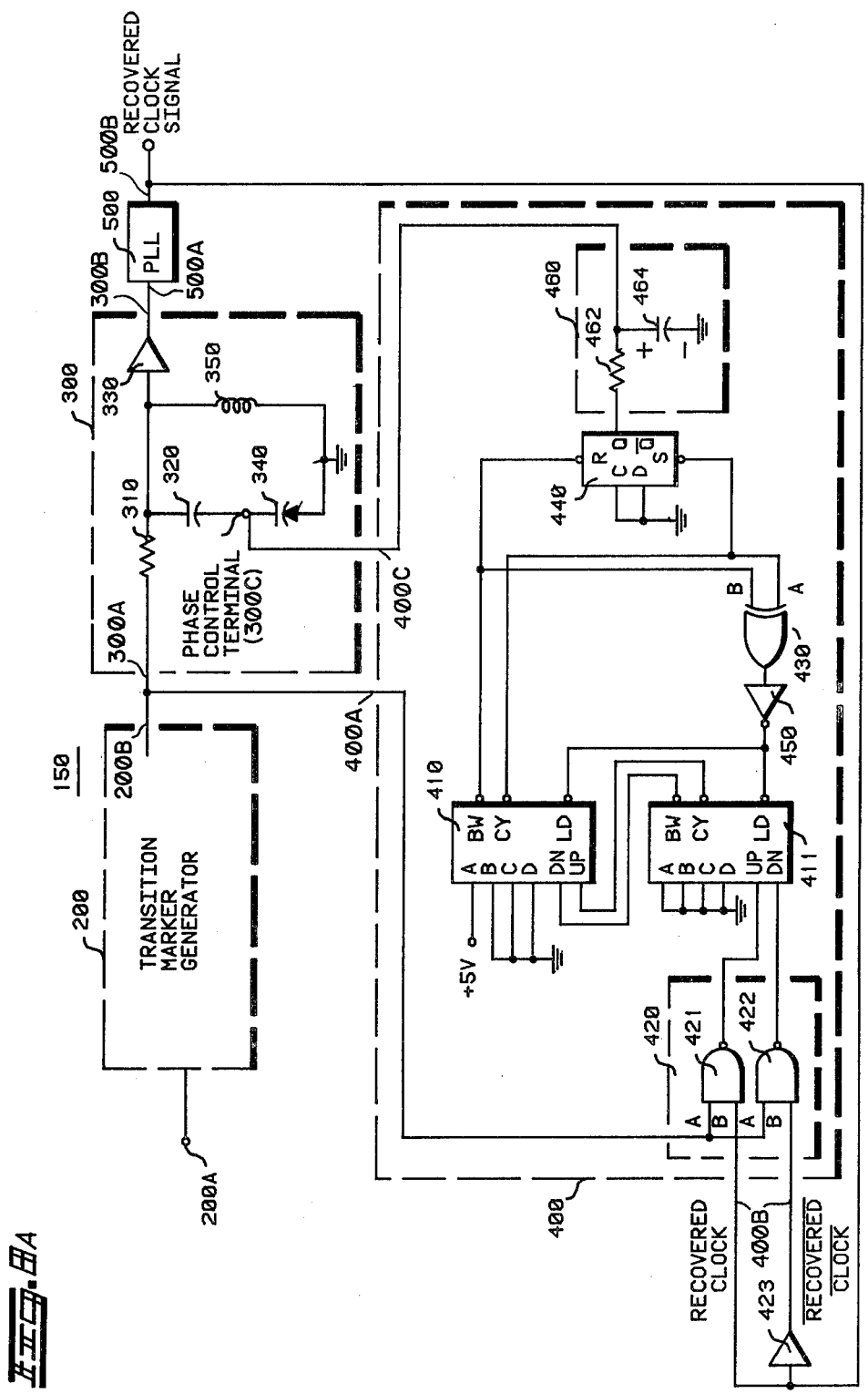

PHASE CORRECTED CLOCK SIGNAL RECOVERY CIRCUIT

BACKGROUND OF THE INVENTION

This invention relates to multilevel digital signal decoding systems, and more particularly to phase corrected clock signal recovery apparatus for band-limited multilevel digital signals.

DESCRIPTION OF THE PRIOR ART

Digital signals are conventionally transmitted through a variety of media, for example, hard wire lines and radio communication links. Such digital signals are transmitted at a rate referred to as the data rate or the clock signal frequency. To decode these digital signals upon reception, it is necessary to process the received digital signal in such a manner as to generate a recovered clock signal having a frequency and phase equal to the original clock signal. The recovered clock signal is conveniently used to instruct a sampling circuit to sample the incoming pulses comprising the received digital signal at appropriate times. Decoding of the received digital signal is thus facilitated.

Generating a recovered clock signal from a received digital signal having a predetermined data rate is a relatively simple matter when the digital signal is pure binary, that is, comprised of nonband-limited square wave-like signals with the high portion of the square wave cycle representing a logical one and the low portion of the square wave cycle representing a logical zero. Although ideally each leading edge of the pulses comprising the recovered clock signal should begin at the middle of each respective bit of the binary digital signal, the phase of the recovered clock signal may vary as much as plus or minus 90° from the middle of each bit. Even with such large phase variations, the timing of the recovered clock signal is still sufficient to adequately instruct a sampler or other decoder when to sample the bits of a pure binary signal.

One system for extracting a recovered clock signal from pulse coded binary digital data is a pulse-code-modulated (PCM) data retiming system which recovers clock pulses from an original PCM data signal and adjusts the phase of these recovered clock pulses to obtain accurate sampling and retiming of the original PCM data signal. The retiming system includes an edge trigger circuit for generating a recovered clock signal having the same frequency as the clock signal used to generate the original PCM data signal. The recovered clock signal is applied to the input of a three-port surface acoustic wave (SAW) device thus producing first and second signals having the same amplitude and frequency but different phase. A pair of variable gain amplifiers operate on the first and second signals in conjunction with a phase summing arrangement to provide a phase adjusted recovered clock signal. Thus, one way to recover the clock signal from encoded binary data and to appropriately adjust the phase thereof is provided. Although the above-described retiming system circuit likely functions well for the two level binary pulse coded modulation signals for which it is designed, it does not address the problems of clock signal recovery and phase correction of recovered clock signals for multilevel digital signals and band-limited digital signals.

Another data recovery system for extracting a clock signal from binary digital data involves a preamble signal constituting a string of a predetermined number of clock pulses which are transmitted prior to transmission of a binary digital data signal. Such recovery system includes a preamble detection circuit coupled to separation logic circuitry. When a preamble is detected by the preamble detection circuit, the separation logic circuitry is activated to separate clock pulses from the incoming raw data signal. The separated clock pulses are provided to a phase locked loop which issues recovered clock signals at a frequency determined by the clock rate of the incoming raw data. Although the above-described data recovery system achieves clock signal recovery for a binary digital signal, it does not provide clock recovery for band-limited or multilevel digital signals.

Due to frequency spectrum consumption considerations it is often desirable to transmit a band-limited digital signal rather than a square wave type binary signal. When binary digital signals are modulated on an electromagnetic wave for transmission purposes, a relatively large amount of frequency spectrum is consumed, whereas band-limited digital signals occupy substantially less spectrum when so modulated. Examples of binary digital signals and band-limited digital signals are respectively shown in FIGS. 1A and 1C. The corresponding recovered clock signal for the band-limited digital signal of FIG. 1C is illustrated as a dashed line in FIG. 1C. A band-limited binary digital signal is, in simple terms, a modified version of the binary digital signal in which the sharp square edges of the binary signal are rounded off (typically by filtering) such that when modulated on an electromagnetic carrier wave, a reduced amount of spectrum approaching that of the ideal Nyquist bandwidth is consumed. Although valuable frequency spectrum is thus conserved, it becomes extremely important that one of either the leading or trailing transitory edges of each recovered clock pulse correspond closely with the center of each respective bit comprising the band-limited digital signal. This phase relationship is required such that the recovered clock signal may be employed to activate a sampler at optimum times to sample each of the bits of the band-limited digital signal. If even a relatively small amount of phase error is present in the recovered clock signal, sampling of the digital signal may occur just before or just after the middle or each bit of the digital information signal thus resulting in some loss of signal information.

To more efficiently transmit data it is often desired to transmit more than one stream of data on a single digital signal. The examples discussed above all refer to binary digital systems, that is, systems in which a single data stream comprised of two logic levels (1's and 0's) is transmitted and processed. Two or more data streams of 1's and 0's may be transmitted in a single multilevel digital signal such as that illustrated in FIG. 2A. A multilevel digital signal is defined to be a digital signal having more than two logic levels. The multilevel digital signal shown in FIG. 2A is of the nonband-limited square wave type and thus results in excessive consumption of frequency spectrum when modulated on an electromagnetic carrier wave. To reduce such spectrum consumption, the square wave type multilevel digital signal is band-limited or rounded as shown in FIG. 2B. To recover the original data streams of digital information from the band-limited multilevel signal, it is important that one of either the leading or trailing transitory edges of the recovered clock pulses, which control the times at which the multilevel digital signal is sampled, begin at the center of each multilevel digital bit. Otherwise, signal information is potentially lost.

It is one object of the present invention to provide a clock signal recovery circuit capable of recovering a clock signal from band-limited multilevel digital signals without incorporating additional clock signal information, such as a preamble, on the multilevel digital signal.

Another object of the invention is to provide a clock signal recovery circuit which generates a recovered clock signal having a frequency substantially equal to the original clock frequency of the multilevel digital signal.

It is a further object of the invention to provide a phase corrected clock recovery circuit which generates a recovered clock signal with one of either the leading or trailing transitory edges of each recovered clock pulse beginning at the center of each respective bit of the multilevel digital signal.

BRIEF SUMMARY OF THE INVENTION

The present invention is directed to generating a phase corrected recovered clock signal from a received band-limited multilevel digital signal.

In accordance with one embodiment of the invention, a clock signal recovery apparatus includes a receiver for receiving a transmitted multilevel digital signal. A transition marker generator is coupled to the receiver. Each time the multilevel digital signal received by the receiver crosses any of a plurality of predetermined threshold levels, the transition marker generator generates a transistion marker signal. The transition marker generator thus produces a plurality of transition marker signal groups with eye intervals being interspersed among the transition marker signal groups. An eye interval follows each transition marker group in time. Eye intervals are subsequently defined and discussed. The clock signal recovery apparatus includes a recovered clock signal generator coupled to the transition marker generator and responsive to the transition marker signals. The recovered clock signal generator generates a recovered clock signal having pulses with selected transitory edges occurring substantially at the centers of respective eye intervals. Optimum sampling of a multilevel digital signal is thus made possible.

DESCRIPTION OF THE DRAWINGS

FIG. 1A is a graphical representation of a typical nonband-limited two level digital signal.

FIG. 1B is a graphical representation of a recovered clock signal.

FIG. 1C is a graphical representation of a band-limited two level digital signal with a recovered clock signal superimposed thereon.

FIG. 3A is a graphical representation of an eight level square wave type nonband-limited multilevel digital signal accompanied by Table 2 showing the logic levels which may be assumed by the data streams comprising the eight level signals.

FIG. 3B is a graphical representation of an eight level band-limited multilevel digital signal shown with a recovered clock pulse superimposed thereon.

FIG. 3C is a transition diagram of an eight level band-limited multilevel digital signal showing all possible transitions between the levels of the signal and further showing transition markers each time a threshold level between the logic levels of the digital signal is crossed.

FIG. 4 shows a block diagram of the phase corrected clock signal recovery circuit of the present invention.

FIG. 5A is a timing graph showing a plurality of superimposed transition marker groups generated by the transition marker generator portion of the invention.

FIG. 5B is a timing graph of the recovered clock signal without the phase correction having a phase error $\theta$.

FIG. 5C is a timing diagram of a phase corrected recovered clock signal.

FIG. 6 is a block diagram of the transition marker generator portion of the invention compatible with an eight level digital band-limited signal.

FIG. 7 is a detailed schematic diagram of the transition marker generator of FIG. 6.

FIG. 8A shows a detailed schematic diagram of the phase corrected clock signal recovery circuit of the present invention except for the transition marker generator portion thereof which is shown in block diagram form.

FIG. 8B is a timing graph of transition marker groups interspersed with eye intervals showing ideally phased and erroneously phased lagging recovered clock signals.

FIG. 8C is a timing graph of transition marker groups interspersed with eye intervals showing ideally phased and erroneously phased leading recovered clock signals.

FIG. 8D is a frequency spectrum graph of the transition marker groups generated by the transition marker generator.

DETAILED DESCRIPTION OF THE PREFERRED EMBODIMENT

Figure 2A:
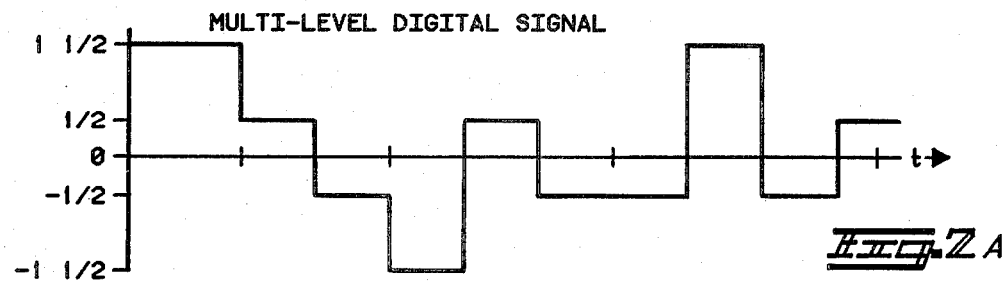
FIG. 2A is a graphical representation of a four level nonband-limited square wave type multilevel digital signal accompanied by Table 1 showing the logical levels which may be assumed by the data streams comprising the four level digital signal.

To enable better understanding of the clock recovery circuit of the present invention, a brief discussion of the nature of conventional two level binary digital signals and band-limited multilevel digital signals is presented. FIG. 1A shows a binary (two level) square wave type digital signal which has been transmitted at a selected data rate, f, via selected transmission media, for example, a hard wire line and received by conventional means. The digital signal is comprised of one data stream of 1's and 0's as shown. To receive this binary digital signal, a recovered clock signal is generated from the received digital signals. This recovered clock signal has a frequency, f, equal to that of the clock signal originally associated with generation of the binary digital signal. The phase of the recovered clock signal (See FIG. 1B) is adjusted such that a transitory edge of each pulse of the recovered clock signal (for example, the leading edge) occurs during a respective bit of received digital signal information. This may be a very coarse adjustment indeed in the case of the binary signal for reasons already discussed in the description of the prior art. This phase adjusted recovered clock signal is conveniently applied often via a phase locked loop circuit to a sampling circuit to instruct the sampling circuit to sample the incoming bits of the received digital signal at an appropriate time during each bit. Depending on the design of the particular sampling circuitry selected, such sampling circuitry may be instructed to sample the digital upon occurrence of either the leading or trailing transitory edge of the recovered clock signal as desired. For convenience, however, subsequent discussion will refer to sampling during the leading transitory edge of the recovered clock signal.

FIG. 1C shows a band-limited two level digitally coded signal with a recovered clock signal superimposed thereon for comparison purposes. The band-limited waveform is conveniently rounded to conserve valuable frequency spectrum when modulated on an electromagnetic carrier wave. Each peak or valley in this band-limited digital signal corresponds to a one or zero bit; respectively. To receive such a band-limited digitally coded signal, it is important that the recovered clock signal generated from the received digital signal has each leading transitory edge thereof corresponding to the substantial center of each respective peak or dip in the digital signal. This is necessary to achieve sampling of the band-limited received digital signal at optimal times and to thus avoid the loss of signal information. If the phase of the recovered clock signal is such that the leading transitory edge of the recovered clock signal is either slightly behind or slightly ahead of the center of each bit of the received digital signal, it is seen that signal information is potentially lost. More specifically, a logical high bit (1) is deemed to be received when the incoming band-limited digital signal exceeds a preselected threshold value, $V_T$, for example. When the received band-limited signal has a value less than $V_T$, a logical low bit (0) is deemed to be received. If sampling occurs substantially before the center portion of a received logical high bit, that is, if there is a substantial error in the phase of the recovered clock signal, then although a logical high bit is supposed to be detected, the sampled portion of that high bit may have not yet reached a value sufficiently large to exceed $V_T$ and be properly detected as a logical high. This is just one type of error which may result if the phase of the recovered clock signal (that is, the leading transitory edges of the pulses thereof) is substantially out of step with the center portion of each respective received digital bit. Thus, it is extremely important to instruct the sampling circuit conventionally used to decode incoming two level band-limited digital signals to sample such received signals at the substantial center of each respective bit (that is, bit interval) where a true peak or dip is most likely to be received and detected.

It is clear that only one data stream of 1's and 0's may be transmitted on the two level digital signals discussed above. Band-limiting of such two level digital signals desirably results in more efficient digital signal transmission in terms of decreased spectrum consumption, but does not increase the amount of information which may be transmitted on the signal itself. Employment of a multilevel digital signal provides a way to achieve such an increase.

FIG. 2A shows a four level square wave type multilevel digital signal in which each unit of time corresponds to one bit interval. Such a signal may be used to transmit two data streams of 0's and 1's on a single multilevel signal. To convey the information contained in these two streams, the multilevel signal exhibits four discrete amplitude levels. As shown in the Table 1 accompanying FIG. 2A, by way of example, a level of $1\frac{1}{2}$ conveniently represents a 0 in the first data stream and a 0 in the second data stream. A level of $\frac{1}{2}$ conveniently represents a 0 in the first data stream and a 1 in the second data stream. The level $-\frac{1}{2}$ represents a 1 in the first data stream and a 0 in the second data stream while a level of $-1\frac{1}{2}$ represents 1's in both the first and second data streams.

Figure 2B:
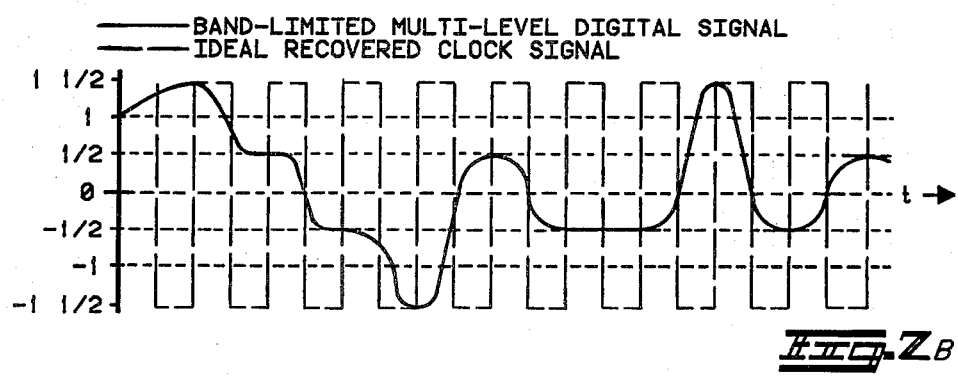
FIG. 2B is a graphical representation of a four level band-limited multilevel digital signal with a recovered clock signal superimposed thereon.

FIG. 2B shows a band-limited version of the four level digital signal of FIG. 2A. An ideally phased recovered clock pulse is shown in dashed lines superimposed over this multilevel band-limited signal. The leading transitory edge of each clock pulse of the recovered clock signal ideally begins at the middle of each bit of information comprising the multilevel digital signal as shown. By way of example, selected threshold levels of 1, 0 and $-1$ are shown as horizontal dotted lines between adjacent logic levels. The selection of such threshold levels facilitates sampling and decoding circuitry in determining which of four levels the digital signal exhibits when sampled at the times determined by the recovered clock pulse signal.

Figure 2C:
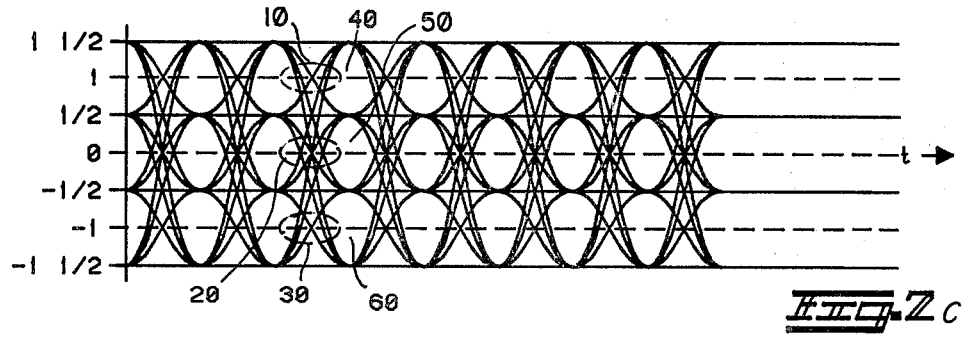
FIG. 2C is a transition diagram of a four level band-limited multilevel digital signal showing all possible transitions between the four levels of a four level signal.

FIG. 2C is a graph showing all possible transitions of a four level band-limited digital signal over several bit intervals. Several groups of threshold crossings are observed such as those indicated at 10, 20 and 30. The term "threshold crossing" is used to indicate the slicing or passing through of a threshold level by the digital signal as it varies in magnitude from logic level to logic level. It should be noted that several "eyes" such as eyes 40, 50 and 60 are formed along each threshold level. The "eyes" represent portions of the threshold levels during which no threshold crossings occur and are designated as such due to their apparent geometric shape. The interval of time during which an "eye" occurs is referred to as an "eye interval". The centers of the eye intervals correspond to the points in time which are the centers of the respective transmitted bits of the four level digital signal. This is seen by comparing FIGS. 2B and 2C which are aligned in time. Thus, the leading transitory edges of the recovered clock pulses should correspond in phase with the center of each respective eye interval to achieve optimum sampling of the multilevel digital signal. This condition is achieved by the present invention and will be discussed in more detail subsequently.

To compress even more signal information on a single multilevel digital signal, an eight level digital signal may be employed. Such an eight level digital signal is completely capable of accommodating three data streams of 1's and 0's. An eight level digital signal is shown in FIG. 3A exhibiting logic levels of 3, 2, 1, 0, $-1$, $-2$, $-3$ and $-4$, for example. Each of these logic levels represents a particular combination of the 0's and 1's comprising the three data streams shown in Table 2 accompanying FIG. 3A. For example, level 3 represents 000, that is, zeroes in all three data streams. The logic level 2 corresponds to 001, that is, a zero in each of the first and second data streams and a 1 in the third data stream, and so forth through the $-4$ logic level. While FIG. 3A illustrates a square wave type eight level digital signal, FIG. 3B shows a band-limited version of the signal of FIG. 3A. FIG. 3C shows a transition diagram for a typical eight level band-limited signal. The transition diagram of FIG. 3C is similar to the transition diagram of FIG. 2C, except that FIG. 3C of course deals with an eight level digital signal. First through seventh threshold levels are indicated as horizontal dashed lines between the logic levels at the following levels by way of example; $2\frac{1}{2}$, $1\frac{1}{2}$, $\frac{1}{2}$, 0, $-\frac{1}{2}$, $-1\frac{1}{2}$, $-2\frac{1}{2}$. Again, several groups of threshold crossings are noted such as those occuring at 70, 80 and 90, for example. Also, by way of example, "eyes" 100, 110 and 120 are designated in FIG. 3C. To facilitate proper sampling of each bit of this multilevel digital signal, the leading transitory edge of each recovered clock pulse should begin at the center (with respect to the time axis) of the respective eye interval corresponding to that bit. The phase corrected clock signal recovery circuit of the invention to be discussed subsequently assures this condition is met.

FIG. 4 is a block diagram of the phase corrected clock signal recovery circuit 150 of the present invention including a transition marker generator 200 for generating at output 200B an electrical pulse having relatively narrow width each time one of the seven thresholds of an eight level multilevel digital signal applied to input 200A thereof is crossed. It should be understood that the invention is applicable to multilevel digital signals having levels other than eight and that the eight level digital signal clock signal recovery circuit 150 is discussed here by way of example. The transition marker signal appearing at the output of transition marker generator 200 is shown in the lower portion of FIG. 3C for convenience. It is seen that groups of transition marker pulses resembling picket fences are generated when the received multilevel digital signal crosses the thresholds between logic levels as its amplitude changes from level to level and from bit to bit. Spaces corresponding to the eyes of the FIG. 3C transition pattern are interspersed between the groups of transition marker pulses. These spaces represent eye intervals (100', 110' and 120', for example) during which no thresholds are crossed during the respective portions of the bit intervals corresponding thereto. It is in the center of these eye intervals where the leading transitory edge (or the trailing transitory edge if desired) of the recovered clock pulse should appear to enable optimum sampling of the multilevel digital signal.

Referring again to FIG. 4, the output 200B of transition marker generator 200 is coupled to the input 300A of an electronically tuned bandpass filter 300 which includes input, output and phase control terminals, 300A, 300B, 300C, respectively. Bandpass filter 300 takes the form of a varactor tuned filter in one embodiment of the invention. Bandpass filter 300 rejects signals other than those having a frequency substantially equal to the fundamental frequency at which the transition marker groups are generated. Filter 300 filters the transition marker group signals passing therethrough such that an approximately sinusoidal signal is generated at filter output 300B. The frequency of this approximately sinusoidal signal is equal to the fundamental frequency of the transition marker group signals. Bandpass filter 300 additionally shifts the phase of signals applied to the input thereof (see FIG. 5A) in either a positive or negative direction to an extent determined by a phase error signal applied to phase control terminal 300C. Filter output 300B is coupled to the input 500A of a phase lock loop circuit 500. Phase lock loop 500 produces a recovered clock signal at the output 500B thereof comprising a square wave type signal having a frequency locked to the frequency of the approximately sinusoidal signal applied to phase lock loop circuit input 500A.

CLock signal recovery circuit 150 includes a phase error detector circuit 400 having inputs 400A and 400B coupled respectively to transition marker generator output 200B and phase lock loop circuit output 500B. Phase error detector 400 generates a phase error signal at detector output 400C which is coupled to phase control terminal 300C. The phase error signal exhibits a value which is sufficient to appropriately shift the phase of signals passing through filter 300 such that the total phase shift through filter 300 and phase lock loop 500 is sufficient to cause a selected transitory edge (leading or trailing) of the pulses comprising the recovered clock signal at phase lock loop output 500B to occur during the substantial centers of respective eye intervals. Thus the selected transitory edge occurs at the middle of each bit interval of the multilevel digital signal. Therefore, the recovered clock output signal at 500B is a fully phase corrected recovered clock signal having a frequency equal to that of the original clock signal employed to generate the multilevel digital signal. These characteristics permit such recovered clock signal to be employed to instruct sampling circuitry (not shown) to sample the incoming bits of multilevel digital signal information at optimal times.

In the embodiment of the invention shown as clock signal recovery apparatus 150 in FIG. 4, electronically tuned bandpass filter 300, phase error detector 400 and phase lock loop circuit 500 comprise the recovered clock signal generator portion of such embodiment.

FIG. 5B shows a recovered clock signal having a small but arbitrary phase error $\theta$. Such a recovered clock signal will not permit optimal sampling of a multilevel digital signal. FIG. 5C shows the phase corrected recovered clock signal generated by clock signal recovery circuit 150. Comparing FIGS. 5A and 5C, it is noted that the leading transitory edge of each recovered clock signal pulse (See. FIG. 5C) is centered in a respective eye interval, 100', 110' and 120', for example (See FIG. 5A). Optimum sampling of the incoming multilevel digital signal is thus enabled.

FIG. 6 is a block diagram of transition marker generator 200. Generator 200 includes a bank 210 of N−1 comparators where N equals the number of logic levels possessed by the multilevel digital signal applied to the clock recovery circuit 150 of the invention. Thus, N−1 equals the number of thresholds associated with such an N level digital signal. A different threshold reference voltage is associated with each comparator of comparator bank 210. Appropriate threshold reference voltages are applied to the reference voltage inputs of each comparator of bank 210 such that each time a threshold voltage is crossed in either a positive or a negative direction by the incoming multilevel digital signal, the comparator associated with that particular reference voltage respectively changes output voltage state, for example, from a 0 to a 1 or vice versa. The plurality of outputs of comparator bank 210 are operatively coupled to the inputs of an exclusive OR circuit 220. Exclusive OR circuit 220 changes output logic state whenever only one of the plurality of inputs of circuit 220 changes logic state. The output of exclusive OR circuit 220 is coupled to the input of a pulse generator 230 which generates a pulse having a relatively narrow width each time the logic voltage signal applied to the input of generator 230 changes state. A monostable pulse generator of the type well known to those skilled in the art is one type of pulse generator which may be employed as generator 230.

FIG. 7 is a detailed schematic diagram of the transition marker generator portion 200 of the phase corrected recovered clock signal circuit 150 of FIG. 4. It is assumed here for purposes of example that the multilevel digital signal to be processed is an eight level signal although the invention clearly encompasses apparatus for recovering a phase corrected clock signal from multilevel digital signals having virtually any number of logic levels. Comparator bank 210 includes seven comparators designated comparators 211-217. Thus, to reiterate, one comparator is provided for each of the N−1 thresholds associated with the eight level digital signal. Comparators 211-217 each includes a comparator voltage input designated A and a reference voltage input designated B. Comparator reference voltage inputs 211B-217B are respectively coupled to different reference voltages, each reference voltage level being equal to the threshold level associated with the particular comparator. For example, comparator 211 has its reference voltage input 211B coupled to a first threshold voltage between logic level 3 and logic level 2. (See FIG. 3C for a graphic representation of the eight logic levels and the threshold levels situated therebetween.) Comparator input 212B is coupled to a voltage equal to the second threshold between logic levels 2 and 1, and so forth through comparator reference voltage input 217B which is coupled to a voltage equal to the seventh threshold voltage between logic levels −3 and −4. Comparator inputs 211A-217A are coupled together and to the incoming eight level digital signals.

Exclusive OR circuit 220 conveniently includes six two-input exclusive OR gates designated 221-226. Each of exclusive OR gates 221-226 includes respective inputs A and B. Exclusive OR gate inputs 221A and 221B are respectively coupled to the outputs of comparators 211 and 212. Inputs 222A and 222B are respectively coupled to the outputs of comparators 213 and 214. Inputs 223A and 223B are respectively coupled to the outputs of comparators 215 and 216. Exclusive OR gate inputs 224A and 224B are respectively coupled to the outputs of exclusive OR gates 221 and 222. Exclusive OR gate inputs 225A and 225B are respectively coupled to the output of gate 223 and the output of comparator 217. Exclusive OR gate inputs 226A and 226B are respectively coupled to the outputs of gates 224 and 225. The output of exclusive OR gate 226 comprises the output of exclusive OR circuit 220. The output logic signal of exclusive OR circuit 220 changes logic state each time a logic signal at one of the outputs of comparators 211-217 changes logic state. It should be noted that the particular configuration shown for exclusive OR circuit 220 is given by way of example. Those skilled in the art will appreciate that other gate configurations may be employed which are equivalent to exclusive OR circuit 220.

The output of exclusive OR network 220 is coupled to the input of a narrow width pulse generating circuit 230 such as the monostable pulse generator depicted in FIG. 7. More specifically, the output of exclusive OR gate 226 is coupled to an input 231A of a two-input exclusive OR gate 231 and to the input of an inverter 232. The remaining input of gate 231, that is, input 231B, is coupled to one terminal of a resistor 233. The remaining terminal of resistor 233 is coupled to the output of inverter 232. A capacitor 234 couples the junction formed between input 231B and resistor 233 to ground. Whenever a change of logic state occurs in the signal presented to the input of pulse generator 230, that is, at input 231A, the output of exclusive OR gate 231 changes logic state momentarily producing a relatively narrow width pulse, such as a 30 nanosecond pulse, for example. To illustrate this circuit action, assume that a logical 1 presented to input 231A changes state to a logical 0. The output of exclusive OR gate 231 momentarily pulses to a low or 0 logic state. The output of inverter 232 changes from a logical 0 to a logical 1 causing capacitor 234 to begin to charge. When capacitor 234 charges to an extent sufficient to reach the logic threshold inherently associated with input 231B, the output of gate 231 which was momentarily low again changes to a high or 1 logic state. Thus, a negative going narrow width pulse is produced at the output of gate 231. The width of this pulse is typically 30 nanoseconds, although pulses of shorter and longer duration may be employed as desired. An inverter 235 is coupled to the output of gate 231 to invert the polarity of the abovementioned pulses. Each pulse produced by pulse generator 230 is thus a positive going transition marker. The particular monostable pulse generator 230 illustrated is just one type of narrow width pulse generator which may be employed in the invention and the invention is not limited thereto.

FIG. 8A is a detailed schematic diagram of the phase corrected clock signal recovery circuit 150 except for the already discussed transition marker generator 200 which has been shown in block diagram form for convenience. (Momentary reference may be made at this point to the block diagram of circuit 150 in FIG. 4 for refamiliarization purposes.) To understand the structure and functioning of phase error detection circuit 400 it is instructive to examine the relationship between an ideally timed recovered clock signal and the transition marker groups generated by transition marker generator 200 which are fed to the input of phase error detection circuit 400. This relationship is clearly shown in FIG. 8B. Ideally, the recovered clock signal shown as a square wave with solid lines has the leading transitory edge of each pulse thereof centered in the eye intervals between the transition marker groups. It should be noted again that the centers of the eye intervals correspond respectively to the centers of the bits comprising the multilevel digital signal. These points in time are the optimal times to sample the multilevel digital signal. Thus, the purpose of the phase error detection circuit 400 is to assure that the leading transitory edges of the pulses of the recovered clock signal produced at phase lock loop output 500B are centered in the eye intervals. Phase error detection circuit 400 accomplishes this by generating a phase error signal indicating the extent to which the recovered clock signal erroneously either leads or lags in phase the center points of the eye intervals between the transition marker groups.

It is noted that for the ideally phased clock signal (designated 1) shown in FIG. 8B, the number of transition markers (designated 2) occurring during the high portion of each clock signal cycle substantially equals the number of transition markers generated during the low portion of the clock cycle, whereas for a recovered clock signal having a phase error (shown by dashed lines designated 3 and slightly reduced in size for illustrative purposes), the number of transition markers occurring during the high and low portions of each clock pulse cycle are unequal. The particular phase error detection circuit 400 to be subsequently discussed includes up/down counters 410 and 411 for counting the number of transition markers occurring during the high portion of each cycle of the recovered clock signal and the number of transition markers occurring during the low portion of each cycle of the recovered clock signal and includes additional circuitry to generate a phase error signal when these quantities are not equal. This phase error signal exhibits indicia of the extent of the above inequality. Typically, the amplitude of the phase error signal varies in accordance with the extent of the inequality and thus with the amount of phase error.

Referring again to FIG. 8A to explain one way in which such phase error signal may be generated, phase error detection circuit 400 includes a steering circuit 420 (discussed in detail subsequently) comprised of NAND gates 421 and 422 each having two inputs designated A and B. Inputs 421A and 422A are coupled together and to transition marker generator output 200B. Input 421B is coupled to the phase lock loop circuit output 500B and thus the recovered clock signal is provided to input 421B. Input 422B is coupled via an inverter 423 to the phase lock loop circuit output 500B. Thus, the complement of the recovered clock signals is provided to input 422B. Phase error detection circuit 400 includes the above-mentioned up/down counters 410 and 411 coupled together in a cascaded configuration. Of course, the cascading of counters 410 and 411 enables these counters to count to larger numbers than those which they would be individually capable of. Counters 410 and 411 each include up (UP), down (DN), load (LD), carry (CY), borrow (BW) and four preset number terminals (A, B, C and D). One type of negative logic counter which may suitably be employed as counters 410 and 411 is the model 74193 manufactured by Texas Instruments, Inc. Counters 410 and 411 count negative pulses, that is, logical 0's. More specifically, when a plurality of logical 0's are provided to the up terminal of one of such counters, the counter counts up until overflow occurs, at which time a logical 0 is generated at the carry terminal of the counter. Conversely, when a plurality of logical 0's are provided to the down terminal of such counter, the counter counts down until underflow occurs, at which time a logical 0 is generated at the borrow terminal of the counter.

The outputs of steering circuit NAND gates 421 and 422 are respectively coupled to the up and down terminals of counter 411. It is seen in FIG. 8A that transition marker pulses are applied to one input of each of NAND gates 421 and 422. During high portions of the recovered clock signal, both inputs of NAND gate 421 are high at each instant a transition marker is applied to gate 421. Thus, for each positive transition marker applied to gate 421 during a high portion of the recovered clock signal, a corresponding logical zero is generated at the output of gate 421. Each logical zero thus generated is provided to the up terminal of counter 411 and is counted by counter 411. During low portions of the recovered clock signal, by action of inverter 423 on the recovered clock signal, one input of NAND gate 422 is high. The remaining input of NAND gate 422 is also high during the low portions of the recovered clock signal at the instants in time when the positive transition markers are applied to gate 422. Thus, for each positive transition marker applied to gate 422 during a low portion of the recovered clock signal, both inputs of gate 422 are high. This causes a logical zero corresponding to each transition marker to be generated at the output of NAND gate 422. Each logical zero thus produced is provided to the down terminal of counter 411 which counts down in response thereto.

The borrow and carry terminals of counter 411 are respectively coupled to the down and up terminals of counter 410. The four preset number input terminals of counter 410 designated 410A-410D are respectively coupled to appropriate logic level voltages to cause counter 410 to commence counting at the preset value of the number 1000. More specifically, preset input 410A is coupled to a supply voltage of +5 volts, for example, representing a logical high or 1. Preset terminals 410B-410D are coupled to ground which represents logical 0's. Preset inputs 411A-411D are all coupled to ground which represents logical 0's on these inputs. Thus, the cascaded counter formed by counters 410 and 411 is preset to initiate counting at the preset number 10,000,000 when that number is loaded into counters 410 and 411 by application of logical 0's to the load terminals thereof. To control such loading, phase error detector 400 includes an exclusive OR gate 430 having inputs 430A and 430B. Inputs 430A and 430B are respectively coupled to the carry and borrow terminals of the counter 410. The R and S input terminals of an RS flip-flop circuit 440 are respectively coupled to the borrow terminal of counter 410 and the node formed by the connection of the carry terminal of counter 410 and exclusive OR gate input 430A. Flip-flop circuit 440 includes C and D terminals which are coupled to ground and further includes output terminals Q and $\overline{Q}$. A negative logic flip-flop, for example, the model SN7474 manufactured by Texas Instruments, Inc., is conveniently employed as flip-flop circuit 440. A logical 1 is generated at the Q output of flip-flop 440 when a logical 0 pulse is provided to the S input therof, whereas a logical 0 is generated at the Q output when a logical 0 is provided to the R input of flip-flop 440. The output of exclusive OR gate 430 is coupled to the input of an inverter 450, the output of which is coupled to the load terminals of counters 410 and 411. Thus, as will be explained in greater detail subsequently, whenever a logical 0 is generated at either the borrow or carry terminal of counter 410, a logical zero is provided to the load terminals of counters 410 and 411 causing the preset number to be loaded into such counters.

To reiterate, when the recovered clock signal is high (see FIG. 8B) steering circuit 420 (see FIG. 8A) provides the transition markers occuring during that high pulse to the up terminal of counter 411. When the recovered clock signal is low, the transition markers corresponding to that low portion of the clock pulse cycle are progvided to the down terminal of counter 411. Thus, it is seen that cascaded counters 410 and 411 are continually counting up and counting down. If the clock pulse has its leading transitory edge centered in the middle of the eye interval, that is at the ideal sampling time, when the number of transition markers occurring during the high portion of the recovered clock signal equals the number of transition markers occurring during the low portion of the clock signal. When this condition occurs cascaded counters 410 and 411 will count up from the preset input initial value substantially as much as they count down from such value. Thus, the carry and borrow terminals of counter 410 will respectively overflow and underflow by substantially equal amounts resulting in a signal being generated at the Q terminal of flip-flop 440 which indicates no phase error in the recovered clock signal.

However, if the leading transitory edges of the pulses of the recovered clock signal are not substantially centered in the middle of the eye intervals, but rather erroneously lag the optimal sampling times occurring at the centers of the eye intervals as in the case of the recovered clock signal with phase error in FIG. 8B indicated by the dashed line (3), then it is seen that more transition markers (2) occur during the high portion of the recovered clock signal than during the low portion of the recovered clock signal. In this case, more transition markers are fed to the up terminal of counter 411 than are fed to the down terminal of counter 411 such that the carry terminal of counter 410 will tend to overflow more than the borrow terminal of counter 410 will underflow. Thus, more logical 0's are applied to the S terminal of flip-flop circuit 440 than are applied to the R terminal of flip-flop 440. In turn, the Q output of flip-flop 440 is set to a logical 1 state more often that the ideal case discussed immediately above wherein the leading transitory edges of the recovered clock pulses were substantially centered in the middle of the eye intervals between the transition marker groups. The Q output of flip-flop 440 is coupled to the input of a lowpass filter 460 which smooths or averages the Q output digital signal to form a DC output voltage at the output of lowpass filter 460. Filter 460 conveniently comprises a resistor-capacitor type lowpass filter including a resistor 462 having one terminal thereof coupled to the Q output of flip-flop 440 and forming the input of the filter 460. A capacitor 464 is coupled between ground and the remaining terminal of resistor 462 which comprises the output of filter 460. The output voltage present at the output of lowpass filter 460 is thus a substantially DC quantity representing the amount of phase error exhibited by the recovered clock signal applied to the input (that is, 421A and 422A) of phase error detection circuit 400 at any particular point in time. This quantity will be referred to as the phase error signal. The phase error signal (which in this case is relatively high, indicating a recovered clock signal erroneously lagging the center of the eye intervals) is applied to electronically tuned bandpass filter 300. As will be explained in more detail subsequently, filter 300 acts to cause the phase of the recovered clock signal to be appropriately shifted and corrected such that the leading transitory edges of the recovered clock pulses occur substantially at the centers of respective eye intervals.

However, if the leading transitory edges of the recovered clock pulses (4) erroneously lead the center portions of the eye intervals as in FIG. 8C, then by action of steering circuit 420 more transition markers (2) are applied to the down terminal of counter 411 than are applied to the up terminal of counter 411. Thus, cascaded counters 410 and 411 tend to count down from the preset initial value more than they count up therefrom in turn resulting in more underflow pulses at the borrow terminal of counter 410 than overflow pulses at the carry terminal of counter 410. Therefore more logical 0's are applied to the R terminal of flip-flop 440 than are applied to the S terminal of flip-flop 440. Thus, the Q output of flip-flop 440 is set more often to a logical 0 state than to a logical 1 state. In turn, the phase error signal appearing at the output of low-pass filter 460 will be less than the value which corresponds to no phase error, that is, when the number of borrows and carriers are equal such that the number of logical 0's presented to the R and S inputs of flip-flop 440 are equal. In such cases of no phase error in the recovered clock signal, the output voltage of lowpass filter 460 (that is, the phase error signal) will of course assume some median value between the phase error voltage value when the recovered clock signal is lagging the center of the eye intervals and when the recovered clock signal is leading the center of the eye intervals. However, in the case at hand where more borrows than carries are being generated at counter 410, the number of logical 1's produced at the Q output of flp-flop 440 is correspondingly relatively low resulting in a phase error voltage which is relatively low. This relatively low phase error voltage is applied to electronically tuned bandpass filter 300 to cause the phase of the recovered clock signal, that is, the leading transitory edges of the pulses of the recovered clock signal to be appropriately shifted toward the center of the eye interval until the number of borrows and carries produced by counter 410 become approximately equal. As this recovered clock signal phase correction takes place, the value of the phase error signal progressively changes until it approaches and reaches the median value which indicates no recovered clock signal phase error. When this condition occurs the leading transitory edges of the recovered clock pulses are desirably situated in the centers of the eye intervals resulting in optimum sampling of the multilevel digital signals applied to the input of the phase corrected clock signal recovery circuit.

As previously discussed, when the recovered clock signal is appropriately centered in the middle of the eye intervals, counters 410 and 411 are counting up as much as they are counting down and thus the number of borrows (logical 0's) and carries (logical 0's) produced by the counter 410 are substantially equal. Each time a borrow or carry logical 0 pulse occurs at counter 410, exclusive OR gate 430 is activated to produce a logic signal which causes the number at the preset inputs of counters 410 and 411 to be loaded into counters 410 and 411. The preset input number is selected to be in the middle of the capacity range of cascaded counters 410 and 411. Thus, since the counters selected have a maximum capacity of the number 11,111,111 (255—base 10 equivalent), the number selected for the preset input value is conveniently half that capacity, 10,000,000 (128—base 10 equivalent). This preset initial value provides a starting point from which counters 410 and 411 begin to count either up or down until either overflow (a borrow) or underflow (a carry) is produced. In summary, whenever more carries than borrows are generated by counter 410, the phase error signal generated by phase error detection circuit 400 acts to shift the phase of the recovered clock signal in a manner described in later discussion until the number of transition markers being generated during the low portions of the recovered clock signal equals the number of transition markers being generated during the high portions of the recovered clock signal. By the action of flip-flop circuit 440 already explained, more carries than borrows result in a relatively high phase correction signal whereas more borrows than carries result in a relatively low phase correction signal. The resultant phase correction signal causes the phase of the recovered clock signal to be adjusted such that the number of transition markes occurring during the high portions of the recovered clock signal approximately equals the number of transition markers occurring during the low portions of the recovered clock signal and thus the number of borrows and carries are approximately equal. This results in a phase correction signal median value which signifies the recovered clock signal is nearly ideally timed and thus no further phase correction is necessary. It is to be noted that although in this particular embodiment of the invention the phase error detector 400 is implemented in negative logic, it would be obvious to one skilled in the art to modify detector 400 to employ equivalent positive logic. Such an alternative embodiment is clearly within the scope of the invention. It should also be apparent to those skilled in the art that the present invention is not limited to the particular counters shown and the respective capacity thereof. Rather, an appropriate counter may be selected having a greater capacity or a lesser capacity providing the capacity is not so small as to cause unbalanced counting or so large as to result in slow jitter of the recovered clock signal.

The output 400C of phase error detection circuit 400 is coupled to the phase control terminal 300C of an electronically tuned bandpass filter 300. Electronically tuned bandpass filters as well known to those skilled in the art. The simplified filter circuit shown as filter 300 in FIG. 8A is given only by way of example and it is not intended that the invention be limited thereto. Filter 300 includes a resistor 310, one terminal of which comprises input 300A of filter 300. The remaining terminal of resistor 310 is coupled to one terminal of a capacitor 320 and to the input of an amplifier 330. The output of amplifier 330 constitutes the output 300B of electronically tuned bandpass filter circuit 300. The remaining terminal of capacitor 320 is coupled to the cathode of a varactor diode 340, the node formed by this connection being designated the phase control terminal 300C of filter circuit 300. The anode of diode 340 is coupled to ground. An inductor 350 is connected in parallel with series-connected capacitor 320 and diode 340 in resonant circuit configuration. Filter circuit 300 provides both frequency filtering and phase control of signals passing from input 300A to output 300B of filter 300. More specifically, the capacitance exhibited by varactor diode 340 varies in accordance with the voltage applied to the phase control terminal 300C of filter 300. This variance adjusts the amount of attenuation presented by the filter 300 to signal components of different frequencies by controlling the frequency band (bandpass) which the filter 300 will pass from input to output without substantial attenuation. Frequencies other than those within the bandpass are attenuated by filter 300. The phase of signals passing from input 300A to output 300B of filter 300 is adjusted, that is, caused to lead more or lag more, in accordance with the particular phase error signal applied to the phase control terminal 300C of filter 300. The output of phase error detection circuit 400 is coupled to the phase control terminal 300C. As already discussed under FIG. 4 but reiterated here for purposes of completeness in the discussion of FIG. 8A, input 300A of filter 300 is coupled to the output of transition marker generator 200 such that the transition marker pattern represented in FIG. 5A is supplied thereto. The output 300B of filter 300 is coupled to the input of phase lock loop circuit 500. The output signal of phase lock loop 500 comprises a square wave signal which by the action of circuits 200, 300 and 400 is a recovered clock signal synchronized in frequency and phase with the original clock signal of the multilevel digital signal applied to the input of the phase corrected recovered clock signal circuit 150.

To better understand the action of electronically tuned bandpass filter 300 and phase lock loop circuit 500 it is instructive to examine the frequency spectrum diagram of FIG. 8D of the transition marker signal (FIG. 5A) applied to the input of filter 300. It is seen that the transition marker signal has a fundamental component at a frequency f equal to the rate at which the transition marker groups are generated (that is, the frequency of the clock signal originally employed to generate the multilevel digital signal). Undesired harmonics of the transition marker group frequencies may be generated at frequencies of 2f and 3f, for example. Bandpass filter circuit 300 is tuned to reject the 2f and 3f harmonics and other undesirable signal components such that approximately sinusoidal signal components having a fundamental frequency f appear at the output 300B of filter 300. Therefore, phase lock loop circuit 500 locks to the frequency f applied to its input and produces a square wave recovered clock signal having a frequency f at its output. Phase error detection circuit 400 produces a phase error signal which is applied to the phase control terminal of filter 300 causing filter 300 to appropriately adjust the phase of signals passing therethrough such that phase lock loop circuit 500 generates square wave pulses with the leading transitory edges thereof being centered in respective eye intervals, that is, at the ideal sampling times for the multilevel digital signal. In summary, both the frequency and the phase of the square wave recovered clock signal present at the output 500B of phase lock loop circuit 500 are substantially identical to those of the clock signal of the original multilevel digital signal.

Consistent with the above discussion and in accordance with the present invention, a method is provided for recovering the clock signal from a multilevel digital signal which, to briefly summarize, includes receiving a transmitted multilevel digital signal. A transition marker is generated each time the received multilevel digital signal crosses any of a plurality of predetermined threshold levels. A plurality of transition marker signal groups are thus generated with eye intervals (during which no transition markers are generated) being interspersed among said transition marker signal groups. An eye interval follows each transition marker group in time. A recovered clock signal is generated which includes a plurality of electrical pulses, each pulse having a selected transitory edge occurring substantially at the center of a respective eye interval. Further, a phase error signal is generated which exhibits indicia of the difference in phase between the selected transitory edges of the recovered clock signal pulses and the centers of respective eye intervals. Such phase error signal is employed to cause selected transitory edges of the recovered clock signal pulses to occur at the centers of respective eye intervals as already explained in detail above.

Although a phase corrected clock signal recovery circuit 150 has been here described which generates a phase corrected recovered clock signal from the signal information exhibited by an eight level digital signal, for purposes of example, the invention may also be employed to generate recovered clock signals from multilevel digital signals greater or lesser than eight, for example, four level digital signals, seven level partial response digital signals and other partial response digital signals.

It should be further understood that the invention is not limited to the positive polarity transition marker pulses depicted in the drawings, but also encompasses negative polarity transition markers. However, in either case, the total phase shift exhibited by the filter 300 and phase lock loop 500 must be such that a selected transitory edge of the pulses of the square wave recovered clock signal generated by the phase lock loop 500 occurs at the center of respective eye intervals.

While only certain preferred features of the invention have been shown by way of illustration, many modifications and changes will occur to those skilled in the art. It is, therefore, to be understood that the present claims are intended to cover all such modifications and changes as fall within the true spirit of the invention.

We claim:

1. Apparatus for recovering the clock signal from a received multilevel digital signal comprising:

transition marker generating means, responsive to said received signal, for generating a transition marker signal each time said received signal crosses any of a plurality of predetermined threshold levels, said transition marker generating means thus producing a plurality of transition marker signal groups, each transition marker signal group being followed in time by an eye interval;

electronically tuned bandpass filter means, operatively coupled to the output of said transition marker generating means for attenuating undesired signal components of said transition marker groups exhibiting a frequency substantially above or substantially below the fundamental frequency of said transition marker groups, and for generating an approximately sinusoidal signal at the output of said filter means, the phase of said approximately sinusoidal signal varying in accordance with a phase error signal applied to a phase control terminal included in said filter means;

phase lock loop means, operatively coupled to the output of said filter means, for generating a recovered clock signal of pulses exhibiting a frequency substantially equal to and locked to the frequency of said approximately sinusoidal signal, and phase error detecting means, including a first and second inputs operatively coupled to the output of said transition marker generating means and the output of said phase lock loop means, respectively, for generating at the output of said detecting means a phase error signal exhibiting indicia of the difference in phase between a selected transitory edge of said recovered clock signal and the center of said eye intervals, the output of said detecting means being operatively coupled to the phase control terminal of said filter means, such that the phase of said substantially sinusoidal signal is adjusted by said filter means until a selected transitory edge of the pulses of the recovered clock signal occurs at the centers of respective eye intervals.

2. The apparatus of claim 1 wherein said transition marker generating means comprises a narrow width transition marker generator for generating a transition marker pulse exhibiting relatively narrow pulse width each time said received signal crosses anyone of a plurality of threshold levels.

* * * * *